Dec. 17, 1957 — F. VORTHMANN — 2,816,424

FLEXIBLE COUPLINGS

Filed May 16, 1955 — 2 Sheets-Sheet 1

Inventor:
Fritz Vorthmann,
by [signature] Attorney

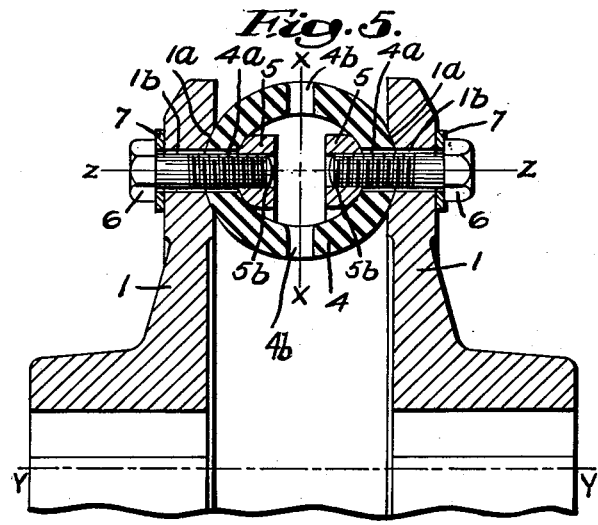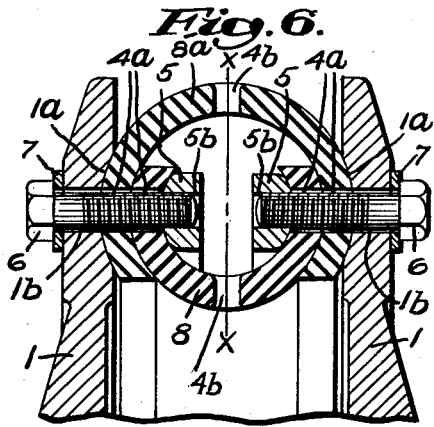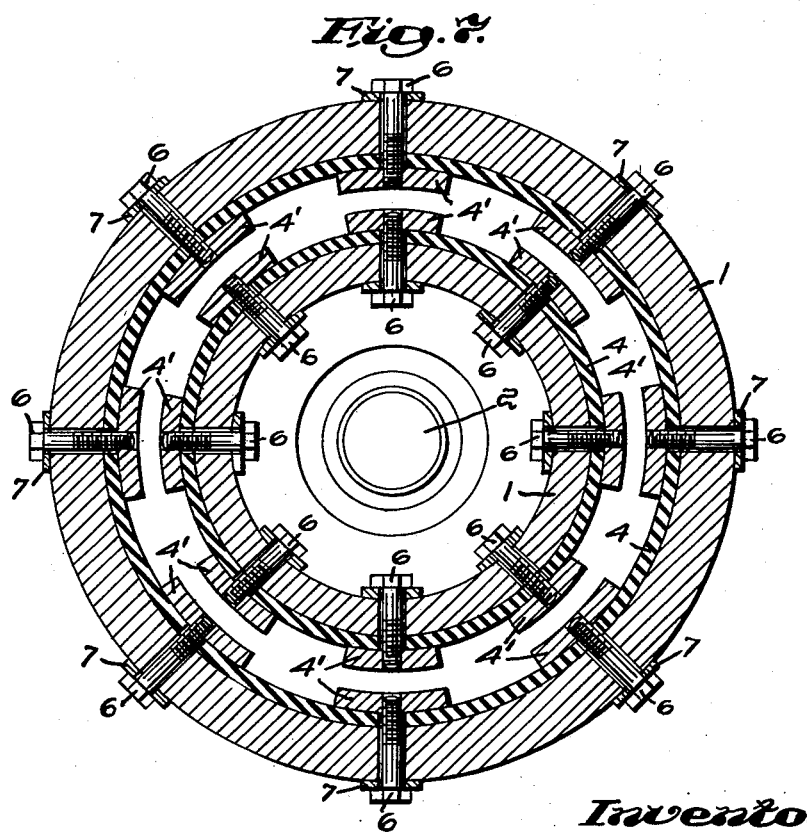

United States Patent Office 2,816,424
Patented Dec. 17, 1957

2,816,424

FLEXIBLE COUPLINGS

Fritz Vorthmann, Bochum, Germany, assignor to Maschinenfabrik Stromag G. m. b. H., Unna, Westphalia, Germany Application May 16, 1955, Serial No. 508,351

Claims priority, application Germany May 21, 1954

8 Claims. (Cl. 64—11)

This invention relates generally to flexible couplings as used for coupling a driving shaft and a driven shaft, and more particularly to flexible couplings comprising a hollow toroidal torque-transmitting member of rubber or like materials.

It is a general object of this invention to provide flexible couplings which are considerably improved over the flexible couplings which were known heretofore.

Another object of the invention is to provide improved flexible couplings capable of being flexed in all directions.

Another object of the invention is to provide improved flexible couplings of the type wherein each of a pair of coupling members is fixedly mounted upon one of a pair of coaxial shafts and wherein the coupling members are tied together by a toroidal coupling element made of a suitable elastomer such as, for instance, vulcanized rubber.

Still another object of this invention is to provide improved versions of flexible couplings of the type disclosed in United States Patent 2,648,958 to Karl Schlotmann, August 18, 1953, Flexible Couplings.

The flexible couplings disclosed in the above patent include a torque-transmitting member made of a rubberlike material which is substantially U-shaped in cross-section or, in other words, has substantially the same cross-section as that of a tire for automotive use.

It is another object of this invention to provide flexible couplings having torque-transmitting members of a rubberlike material capable of transmitting relatively higher torques than those having torque-transmitting members substantially U-shaped in cross-section.

I have found that flexible couplings which are provided with torque-transmitting members of a rubberlike material substantially U-shaped in cross-section have some tendency toward unbalance at high speeds, or high numbers of revolution, respectively.

It is, therefore, another object of this invention to provide flexible couplings having all the advantages of the aforementioned prior art type of flexible couplings and being free from the disadvantages thereof, in particular free from the disadvantage of a tendency toward unbalance at high speeds, or numbers of revolution.

The novel features that I consider characteristic of the invention are set forth in particular in the appended claims. The invention itself, however, both as to structure and operation, together with additional objects and advantages thereof, will best be understood from the following description of several specific embodiments thereof when read in connection with the accompanying drawing, in which:

Fig. 5 shows on a larger scale in longitudinal section a structure of the type shown in Fig. 1;

Fig. 6 is a section similar to that shown in Fig. 5 of a modification of the structure shown in Fig. 5; and Fig. 7 is a cross-section of a modification of the structure shown in Figs. 3 and 4.

Figure 1:
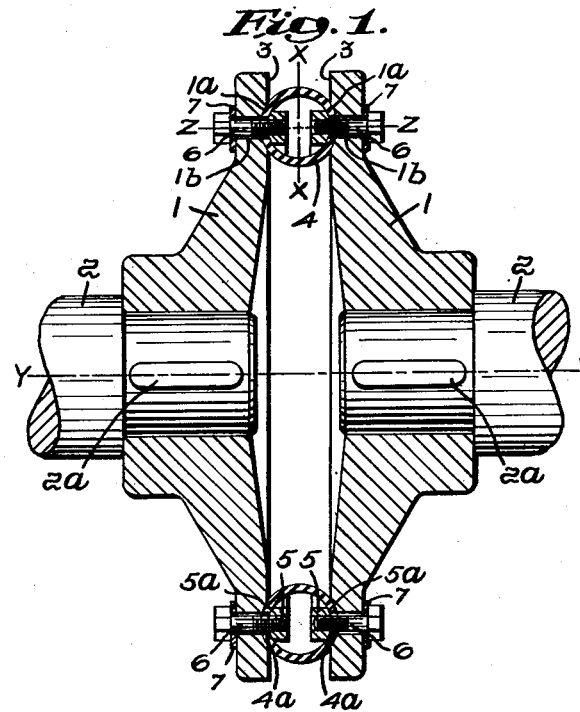
Fig. 1 is substantially a longitudinal section of a first embodiment of the invention.
Figure 2:
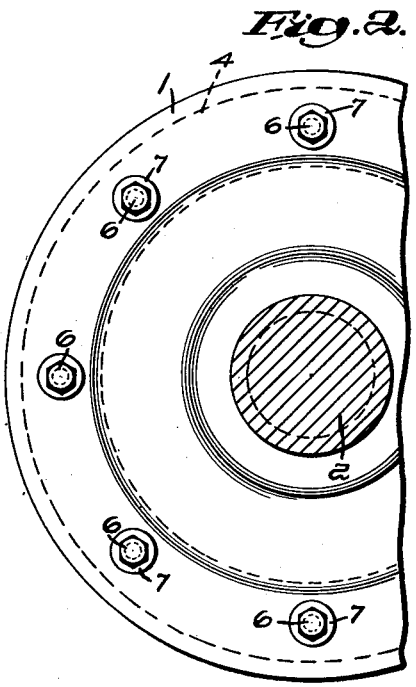
Fig. 2 is a side elevation of the structure shown in Fig. 1 seen from the left side of Fig. 1.

Referring now to the drawing, and more particularly to Figs. 1, 2 and 5 thereof, reference numeral 1 has been applied to indicate a pair of coupling members of which each is fixedly mounted on one of a pair of coaxially arranged shafts 2. One of shafts 2 may be a driving shaft and the other a driven shaft. Each coupling member 1 may be formed by a suitable casting, and keyed to the respective shaft 2 thereof by means of a key 2a. Coupling members 1 define a pair of parallel surfaces or flanges 3, arranged at right angles to the geometrical axis Y—Y of shafts 2. Each of the two spaced coupling members 1 is provided on the juxtaposed surfaces 3 thereof with a circular groove 1a concave in cross-section. A flexible circular tubular torque-transmitting member 4 is arranged in coaxial relation with respect to shafts 2 in the gap formed between surfaces 3, engaging grooves 1a in coupling members 1. Member 4 which is an endless tube may be made of a suitable synthetic elastomer, or of natural vulcanized rubber. Each of a pair of clamping rings 5 arranged within tubular member 4 is in physical contact with a portion of the inner surface thereof facing one of the two grooves 1a in coupling members 1. Each coupling member 1 is provided with a plurality of holes 1b extending parallel to the two shafts 2. Tubular torque-transmitting member 4 is provided with a plurality of holes 4a of which each is arranged in registry with one of the holes in the two coupling members 1. Each clamping ring 5 is provided with a plurality of internally screw-threaded holes which are angularly displaced and of which each is arranged in registry with one of the holes 4a in member 4 and one of the holes 1b in members 1. The screw-threaded studs 6 are inserted into registering holes 4a and 1b, and firmly screwed into clamping rings 5, thus clamping clamping rings 5 against the grooved surfaces or grooves 1a in members 1. The surfaces of clamping rings 5 engaging member 4 are shaped spherically and conform to the spherical cross-sectional shape of grooves 1a. Suitable washers 7 tending to prevent loosening of screws or studs 6 once tightened are inserted between the axially outer surfaces of members 1 and the hexagonal heads of the screws or studs 6. Torque-transmitting member 4 is provided with a plurality of venting holes 4b arranged to intersect with the longitudinal geometrical axes X—X thereof at right angles the annular geometrical axis of tube 4. The axes X—X of venting holes 4b are angularly displaced about 90 degrees with respect to the common longitudinal axes Z—Z of holes 1b and 4a.

In addition to effecting venting of the inside of tube 4 holes 4a come in very handy when mounting tube 4 between the two flanges 3 of coupling members 1 since they enable them to readily move or shift tube 4 by placing a finger into them.

Figure 3:
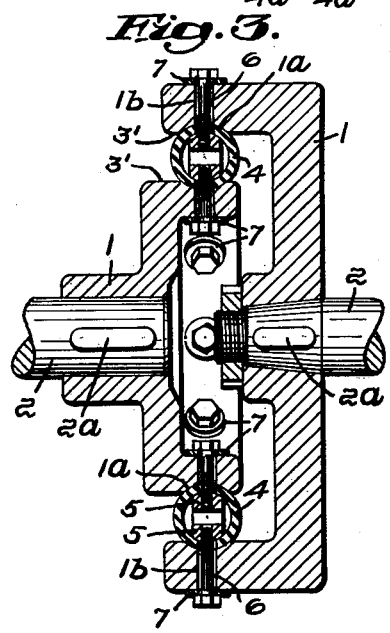
Fig. 3 is substantially a longitudinal section of another flexible coupling embodying my invention.
Figure 4:
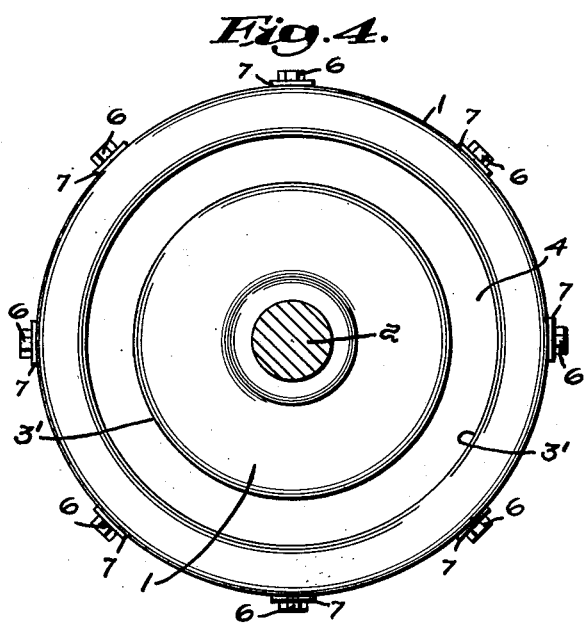
Fig. 4 is a side view of the structure shown in Fig. 3 seen from the left side of Fig. 3.

Referring now to Figs. 3 and 4 wherein the same reference characters as in Figs. 1, 2 and 5 have been applied to indicate like parts, this embodiment of the invention comprises two shafts 2 of which each fixedly supports a coupling member 1. Keys 2a or other suitable means may be used to fixedly secure coupling members 1 upon shafts 2. Left coupling member 1 is provided with a cylindrical surface 3′ having a relatively small diameter and right coupling member 1 is provided with a cylindrical surface 3′ having a relatively large diameter. Both surfaces 3′ are arranged coaxially with respect to shafts 2. One of a pair of circular grooves 1a is formed in each of the cylindrical surfaces 3'. Each coupling member 1 is provided with a plurality of holes 1b extending across grooves 1a at right angles to shafts 2. A circular tubular torque-transmitting member 4 of rubberlike material—which term is intended to include natural rubber—is arranged in coaxial relation with respect to shafts 2 and engages each of the two grooves 1a. Member 4 is provided with a plurality of holes 4a arranged in registry with the holes 1a in member 1. The two clamping rings 5 arranged within tube 4 are each provided with a convex surface conforming to the concave shape of grooves 1a. The screw-threaded studs 6 are inserted into holes 1a and into the registering holes 4a in tube 4 and engage screw-threaded holes in rings 5 to firmly clamp the latter against the internal wall of tube 4 juxtaposed to grooves 1a.

Referring now to Fig. 6, reference characters 1 have been applied to indicate a pair of coupling members mounted on a pair of shafts (not shown) in the same way as illustrated in Figs. 1, 2 and 5 and described in connection therewith. Members 1 are provided with a pair of grooves 1a on juxtaposed surfaces thereof into which an endless tubular torque-transmitting member 8, 8a has been inserted. This torque-transmitting member is made up of two layers. Reference letter 8 has been applied to indicate the lower of the two layers and reference letter 8a to indicate the upper of the two layers. Both layers consist of a rubberlike sheet material and each of them is bent substantially in the shape of a half circle. The diameter of the bend of layer 8 is relatively small and that of the bend of layer 8a relatively large. Both layers overlap at the edge regions thereof. Studs 6 of which but two have been shown in Fig. 6 project through the overlapping edge regions of layers 8 and 8a.

The coupling illustrated in Fig. 6 is particularly easy to manufacture and has great mechanical strength and a long life under the most adverse operating conditions.

The tubular torque-transmitting member shown in Fig. 6 is provided with a plurality of venting holes 4b of which some are formed in layer 8 and others in layer 8a. Reference characters X—X have been applied to indicate the geometrical axis of two coaxial venting holes 4b.

Referring now to Fig. 7, this figure illustrates an embodiment of the invention of the type shown in Figs. 3 and 4. Each of the continuous clamping rings 5 shown in Figs. 3 and 4 has been replaced in the structure of Fig. 7 by a plurality of ring sectors to which reference numeral 4' has been applied. Each clamping sector 4' is held in position by a screw-threaded stud 6 of which some project through one and the others through the other coupling member 1. Each clamping sector clamps a portion of tubular torque-transmitting member 4 against one of the two coupling members 1. Washers 7 preclude screw-threaded studs 6 from becoming loose during the operation of the flexible coupling.

It will be readily understood that clamping rings subdivided into sectors as shown in Fig. 7 can also be applied in couplings of the type shown in Figs. 1 and 2.

In Figs. 4 and 5 there are shown two preferred cross-sectional shapes of torque-transmitting member 4; yet it is apparent that other shapes could be imparted to the cross-section of tube 4 without changing the essence of the structure disclosed.

Having described preferred embodiments of the invention in accordance with the patent statutes, it is to be understood that various other changes and modifications may be made in the particular embodiments disclosed without departing from the essential features of the invention. It is, therefore, desired that the invention be interpreted as broadly as possible in view of the prior art, and that it be limited only by what is expressly stated in the following claims.

I claim as my invention:

1. A flexible coupling comprising in combination a pair of coaxial shafts, a pair of spaced coupling members each comprising a flange portion and each fixedly mounted on one of said pair of shafts, a hollow torque-transmitting element in the shape of an endless tube made of an elastomer arranged in coaxial relation with respect to said pair of shafts within the space bounded by said flange portion of each of said pair of coupling members, a first clamping means arranged inside said tube engaging the inner lateral wall thereof juxtaposed to said flange portion of one of said pair of coupling members, a second clamping means arranged inside said tube engaging the inner wall thereof juxtaposed to said flange portion of the other of said pair of coupling members, a first plurality of angularly displaced studs projecting transversely across said flange portion of said one of said pair of coupling members and said lateral wall of said tube into the inside of said tube and cooperating with said first clamping means to clamp said tube to said one of said pair of coupling members, and a second plurality of angularly displaced studs projecting transversely across said flange portion of said other of said pair of coupling members and said lateral wall of said tube into the inside of said tube and cooperating with said second clamping means to clamp said tube to said other of said pair of coupling members.

2. A flexible coupling as specified in claim 1 wherein said tube is provided with a plurality of vent holes interconnecting the space within said tube and the space outside of said tube and arranged to intersect with the geometrical axes thereof the annular geometrical axis of said tube and angularly displaced 90 degrees with respect to the geometrical axes of said first plurality and said second plurality of studs.

3. A flexible coupling comprising in combination a pair of coaxial shafts, a pair of spaced coupling members each fixedly mounted on one of said pair of shafts and each provided on juxtaposed surfaces thereof with a circular groove spherical in cross-section, a hollow torque-transmitting element in the shape of an endless circular flexible tube arranged in coaxial relation with respect to said pair of shafts engaging said circular groove in each said pair of coupling members, a pair of clamping rings arranged within said tube in engagement with the inner surface thereof each in registry with said groove in one of said pair of coupling members, a first plurality of angularly displaced studs projecting across said tube and engaging one of said pair of clamping rings and clamping said tube between one of said pair of coupling members and said one of said pair of clamping rings, and a second plurality of angularly displaced studs projecting across said tube and engaging the other of said pair of clamping rings and clamping said tube between the other of said pair of coupling members and the other of said pair of clamping rings.

4. A coupling as specified in claim 3 wherein said tube is made up of two layers of a rubberlike sheet material bent substantially in the shape of half circles of different diameters, angularly displaced about 180 degrees and overlapping adjacent the edge regions thereof, and wherein said first plurality of studs and said second plurality of studs each project through said overlapping edge regions of both said layers.

5. A flexible coupling comprising in combination a pair of coaxial shafts, a pair of spaced substantially disc-shaped coupling members each fixedly mounted on one of said pair of shafts and each provided on juxtaposed surfaces thereof with a circular groove spherical in cross-section, a hollow torque-transmitting element in the shape of an endless circular flexible tube arranged in coaxial relation with respect to said pair of shafts engaging said circular groove in each said pair of coupling members, a pair of clamping rings arranged within said tube in engagement with the inner surface thereof each having a spherical surface in physical contact with a portion of the inner surface of said tube facing said groove in each said pair of coupling members, each of said clamping rings being constituted by a plurality of separate spaced ring sectors, a first plurality of angularly displaced studs projecting across said tube into the constituent sectors of one of said pair of clamping rings clamping said tube between one of said pair of coupling members and said constituent sectors of said one of said pair of clamping rings, and a second plurality of angularly displaced studs projecting across said tube into the constituent sectors of the other of said pair of clamping rings clamping said tube between the other of said pair of coupling members and said constituent sectors of said other of said pair of clamping rings.

6. A flexible coupling comprising in combination a pair of shafts, a pair of coupling members each fixedly mounted on one of said pair of shafts, a pair of spaced parallel surfaces arranged at right angles with respect to said pair of shafts each forming an integral part of one of said pair of coupling members, a pair of registering circular grooves each formed in one of said pair of surfaces, a plurality of holes in said pair of coupling members each extending parallel to said pair of shafts across one of said pair of grooves, a hollow torque-transmitting element in the shape of an endless tube of rubberlike material arranged between said pair of surfaces in coaxial relation to said pair of shafts engaging said pair of grooves, a plurality of holes in said tube each arranged in registry with one of said plurality of holes in said pair of coupling members, and clamping means including clamping members arranged within said tube in engagement with the inner surface thereof and a plurality of studs associated with said clamping members each extending through one of said plurality of holes in said coupling members and through one of said plurality of holes in said tube for clamping said tube against said pair of grooves.

7. A flexible coupling as specified in claim 6 wherein said tube is provided with a plurality of additional holes permitting continuous venting of the space within said tube.

8. A flexible coupling comprising in combination a pair of coaxial shafts, a pair of coupling members each fixedly mounted on one of said pair of shafts, a pair of cylindrical surfaces of different diameter coaxially arranged with respect to said pair of shafts each forming an integral part of one of said pair of coupling members, a pair of registering circular grooves each formed in one of said pair of surfaces, a plurality of holes in said pair of coupling members each extending at right angles to said pair of shafts across one of said pair of grooves, a hollow torque-transmitting element in the shape of a circular tube of a rubberlike material arranged between said surfaces in coaxial relation with respect to said pair of shafts engaging said pair of grooves, a plurality of holes in said tube each arranged in registry with one of said plurality of holes in said pair of coupling members, and clamping means including clamping members arranged within said tube in engagement with the inner surface thereof and a plurality of studs each extending through one of said plurality of holes in said pair of coupling members and through one of said plurality of holes in said tube for clamping said tube against said pair of grooves.

References Cited in the file of this patent

UNITED STATES PATENTS

| 1,501,187 | Rayfield | July 15, 1924 |
| 1,606,514 | Crist | Nov. 9, 1926 |
| 1,631,433 | Simms | June 7, 1927 |
| 1,642,049 | Waltz | Sept. 13, 1927 |